United States Patent [19]

Szereday

[11] 4,372,854
[45] Feb. 8, 1983

[54] DEVICE FOR REMOVING FLOATING LIQUID IMPURITIES, OIL, FROM A FLOWING WATER SURFACE

[75] Inventor: Pál Szereday, Budapest, Hungary

[73] Assignee: Novex Foreign Trade Co. Ltd. for Development and Commercialization of Inventions, Budapest, Hungary

[21] Appl. No.: 290,806

[22] PCT Filed: Dec. 8, 1980

[86] PCT No.: PCT/HU80/00007
§ 371 Date: Jul. 31, 1981
§ 102(e) Date: Jul. 31, 1981

[87] PCT Pub. No.: WO81/01720
PCT Pub. Date: Jun. 25, 1981

[30] Foreign Application Priority Data

Dec. 12, 1979 [HU] Hungary ............................ AI 291

[51] Int. Cl.³ .............................................. B01D 17/02
[52] U.S. Cl. ................................ 210/242.3; 210/923; 210/538
[58] Field of Search ............. 210/747, 776, 170, 242.1, 210/242.11, 242.2, 242.3, 923, DIG. 5, 242.4, 513, 538, 539, 540

[56] References Cited

U.S. PATENT DOCUMENTS

| | | | |
|---|---|---|---|
| 3,662,892 | 5/1972 | Sorensen | 210/242.3 |
| 3,666,099 | 5/1972 | Galicia | 210/242.3 |
| 3,708,070 | 1/1973 | Bell | 210/242.3 |
| 3,715,034 | 2/1973 | Invanoff | 210/242.3 |
| 3,812,968 | 5/1974 | Aramaki | 210/242.3 |
| 3,847,815 | 11/1974 | Chastan-Bagnis | 210/776 |
| 3,850,807 | 11/1974 | Jones | 210/776 |
| 3,951,810 | 4/1976 | Crisafulli | 210/923 |
| 3,966,615 | 6/1976 | Petchul | 210/242 R |
| 4,061,569 | 12/1977 | Bennett | 210/776 |
| 4,111,811 | 9/1978 | Fukuda | 210/242.3 |

FOREIGN PATENT DOCUMENTS 1428818  3/1976  United Kingdom ............. 210/242.3

Primary Examiner—Ernest G. Therkorn

[57] ABSTRACT

Separation of impure surface water layer, separation of mixture of impurities and water and method for implementation of discharging impurities separated, according to which local water level lowering required for flowing impure surface water layer through overflow spillway is performed in conformity with the Bernoulli formula by suction effect produced and maintained by increasing flow rate, while separation taking place in the same step is carried out by the transient decrease of flow rate, then by change of direction. By turbulent-free inflow without decrease of rate really excellent scraping efficiency can be achieved. The device for carrying out said method comprises a submersion body of submersion depth first increasing downstream then decreasing, provided with opening serving as hopper to produce suction effect, on bottom in range of greatest submersion cross-section or behind latter, with adjustable spillway on front end on side of inflow, whereas with baffle plate controlling direction of flow and defining cross-section in inner space of submersion body, and with a flow-free zone for collecting the impurities separated.

3 Claims, 2 Drawing Figures

DEVICE FOR REMOVING FLOATING LIQUID IMPURITIES, OIL, FROM A FLOWING WATER SURFACE

TECHNICAL FIELD

The invention relates to a method for removing floating liquid impurities, particularly oil, from a flowing (or forced flowing) water surface by creating locally a water surface range of lowered level, by letting in surface layer of water contaminated (by oil) in the range of water of lowered level through spillway, by separating the mixture of liquid impurities and water, and by removing the separated, collected impurities. Furthermore, the invention relates to a device for removing liquid impurities, particularly oil, floating on the water surface, from flowing or forced-flowing water surface, executed as structural units submerged in water, provided with wall elements as well as overflow spillway encircling a range of lowered water level.

BACKGROUND ART

Due to the ever increasing industrialization impurities dangerous to the purity and living substance of natural water sources occur more and more frequently and great efforts are made all over the world to prevent and eliminate them. Among the impurities, petroleum products are reckoned with as the most dangerous ones. Different methods and equipment have been developed in order to remove them. They can practically be divided in two groups, considering the operational principles.

One of the groups contains (oil) scrapers operating on the basis of the so called adhesion principle in such a way that while oil adheres to certain structural matters submerged in impure water—which are afterwards taken out—water does not adhere to them. Thus the oil can be recovered by scraping, wiping, and extraction from means having a generally large surface (rotary discs, elevators, bundles of fibres, tussels) made of such structural materials (steel, plastics, etc.).

The other group involves oil and impurity scraping methods of separating the impured surface layer of water. Their common feature is that the space inside the spillway or overflow ring of a tank floating on water is sucked by a pump suitable for sucking the mixture of impurities and water created by a difference in level between two parts of the spillway. The surface layer of water and the impurities, such as oil, floating together with same on the surface runs slowly, i.e. overflows through the spillway i.e. overflow ring. The pump sucks the mixture of oil and water flowing in and continuously maintains the difference in level. The mixture sucked is separated so that oil would e.g. gravitationally be separated. There is also equipment known having a scraping unit serving at the same time as separator. A common disadvantage of all known equipment is that they can be used with full efficiency for still water only, as a fundamental condition of their efficient operation is that there can be only at least a slight speed difference between the equipment and the impure water. Therefore, such equipment is operated in such a way that the impurities in the vicinity of the scraper are locally stopped by damming, air blast etc. Scraping, however, is in such case of very low efficiency, considerable losses occur, i.e. depending on the water rate under the effect of the sucking swirls produced, one part of the impurities floating on the surface (such as oil) leaves the scraper, bypassing the equipment and the damming elements mostly from below.

DISCLOSURE OF INVENTION

The subject of the invention is to separate the impure surface layer of water, to separate the mixture of impurities and water, and to develop a method and device—realizing the principle of discharging impurities—suitable for the removal, at a high rate of scraping efficiency, of the liquid impurities, particularly e.g. petroleum products, floating on the surface in flowing or forced flowing water.

According to the present invention the separation of the impure surface water layer, separation in the same step and collection of the separate impurities, can be realized in the cleaning cross-section by producing and maintaining expedient speed of flow influenced both in its direction and rate. Accordingly, this aim can be achieved by applying the method referred to above in the course of which, according to the invention, local water level lowering in flowing or forced flowing water is effected by creating i.e. maintaining a flow range of increased speed, while the separation of the mixture by the transient reduction of speed and changing the direction of flow subsequent to the inflow of surface water layer let in said range without any speed reduction. The scraping efficiency can be considerably increased by turbulent-free inflow of the surface water layer in the range of lowered water level.

In a preferably and advantageous performance of the method, the impurities, particularly oil, obtained from the mixture, are separated in a practically flow-free zone inside the range of lowered water level, then from here same is discharged either continuously or intermittently in the known way e.g. by pumping, gravitationally, or by mechanical, or adhesion means, etc.

The device for carrying out the method comprises a tank-like submersion body provided with a spillway, on its open front side facing the water flow, while on the other parts with closed walls overhanging the water surface of a submersion depth first increasing downstream from the front side provided with spillway then gradually decreasing, with at least one opening of adjustable cross-section in the bottom, in the body cross-section of the greatest submersion depth, with a baffle plate in its inner space from the front side provided with spillway, overhanging the range above the bottom hole, dividing the inner space of the body in parts separated from each other.

Such embodiments of the device according to the invention that are provided with spillway of adjustable position (of adjustable height) and/or baffle plate of adjustable angle position have been proved to be suitable. Furthermore, it is advantageous to provide—on the bottom of the submersion body—also a deflection hopper covering the opening from outside, being practically perpendicular to the direction of water flow, provided with an outlet opening of adjustable cross-section.

For the sake of undisturbed outlet—to be effected in intermittent mode of operation too in given cases—of the separated impurities it is advantageous to form even an impurity collecting zone in the submersion body separated by a barrier starting from the bottom and ending under the lowered water level in the front side part opposite to the spillway. For the sake of the possible best turbulent-free inflow of the surface water layer and of ensuring the minimum level of scraping losses, the preferable embodiments of the device according to the invention are provided also with a swirl-diffusion grid arranged in the surface water layer, before the spillway.

The method and device make possible, by using the energy of flow, in one step and one equipment, the collection of liquid impurities e.g. petroleum products floating on the water surface, the separation of the impure surface water layer, the separation of the mixture of impurities and water and the discharging of separated and collected impurities. The impure surface water layer is separated without speed reduction (without damming) and together with the swirl-diffusion grid being on the inlet side of the device it makes it possible to eliminate swirls taking away the layer of impurities, causing in such way loss in discharging. Local lowering of the water level and continuous flowing through of the mixture of impurities and water along the separating forced path are effected by the suction effect produced by the increase of the flow rate, based on the Bernoulli formula, without the utilization of an external power source (e.g. pumping). The separating forced path ensuring undisturbed flowthrough, by its increasing cross-section adjustable by selecting the proper angle position of the baffle plate, performs gradual deceleration of the mixture of impurities and water in the first section subsequent to the inflow, then behind the baffle plate end the flow is performing horizontal rotation, meanwhile, the upper layer of impurities, particularly oil-phase, stops and the lower water layer leaves the inner space of the submersion body, accelerating towards the opening forming the sink of sucking action.

The method and device described above in detail can be widely applied, according to the invention, as portable oil scrapers, fluvial impurity separators—as engineering structures (e.g. in hydro-electric power stations)—preventive oil traps on a fixed plate for the outlet pipeline of impurity sources (e.g. oil refineries, heating plants, etc.) as well as impurity, particularly oil-contamination traps, collecting basins established by bed setting and earthwork, serving for prevention purposes can be made. Furthermore, the characteristics of the method according to the invention can be made use of when designing moving oil scraper ships i.e. the portable preventive devices according to the invention can be applied also as moving impurity, especially oil-scrapers in case they are moved (e.g. pushed or hauled) by a water craft on still water.

BRIEF DESCRIPTION OF DRAWINGS

The essential steps of the method according to the invention and the device according to the invention will now be further described in detail by way of example with reference to the accompanying drawings in which.

BEST MODE OF CARRYING OUT THE INVENTION

Figure 1:
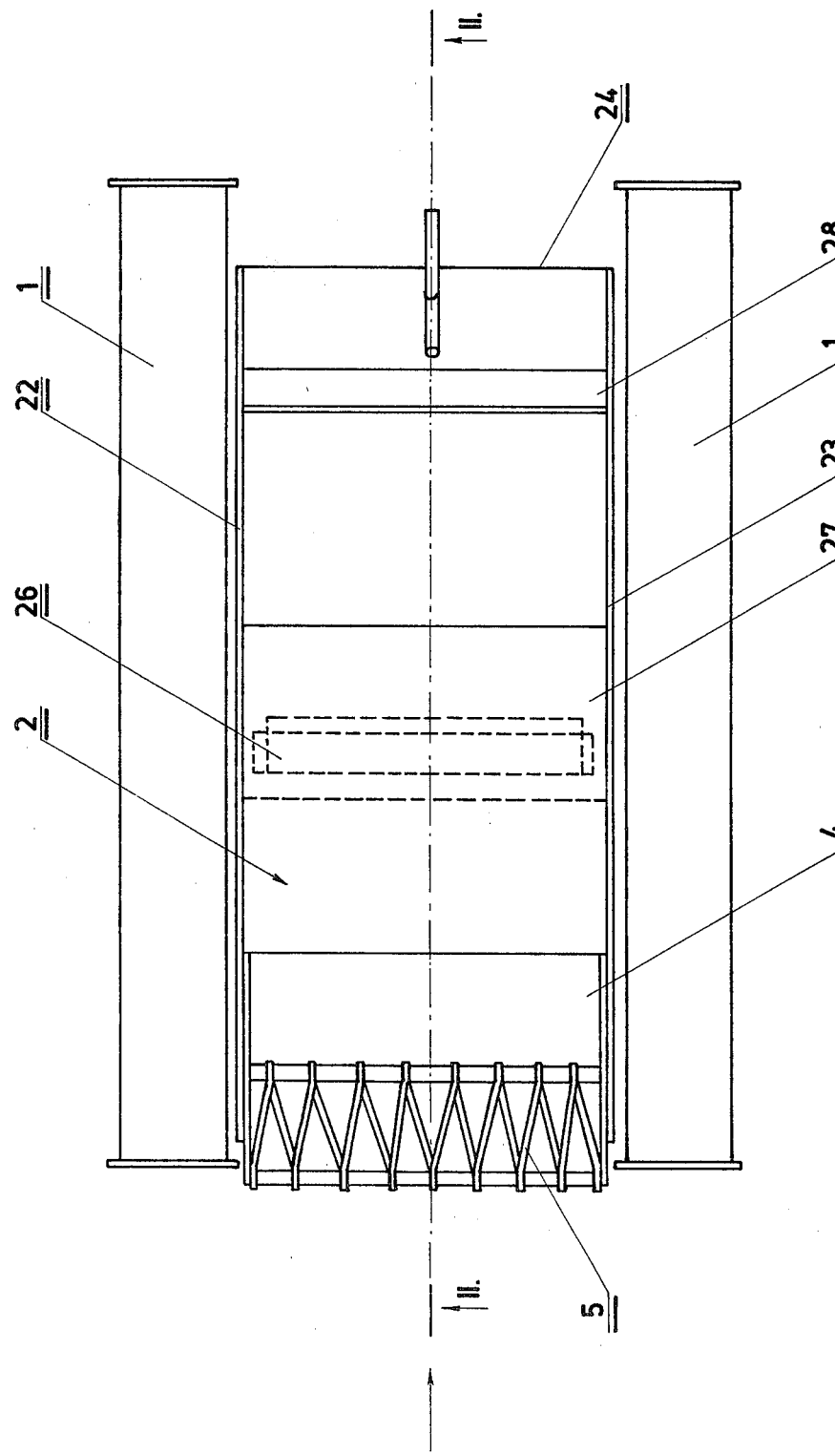
FIG. 1 is a schematic top view of an oil removing device according to the invention and FIG. 2 is a sectional diagram taken along II—II plane of the same device shown in FIG. 1.
Figure 2:
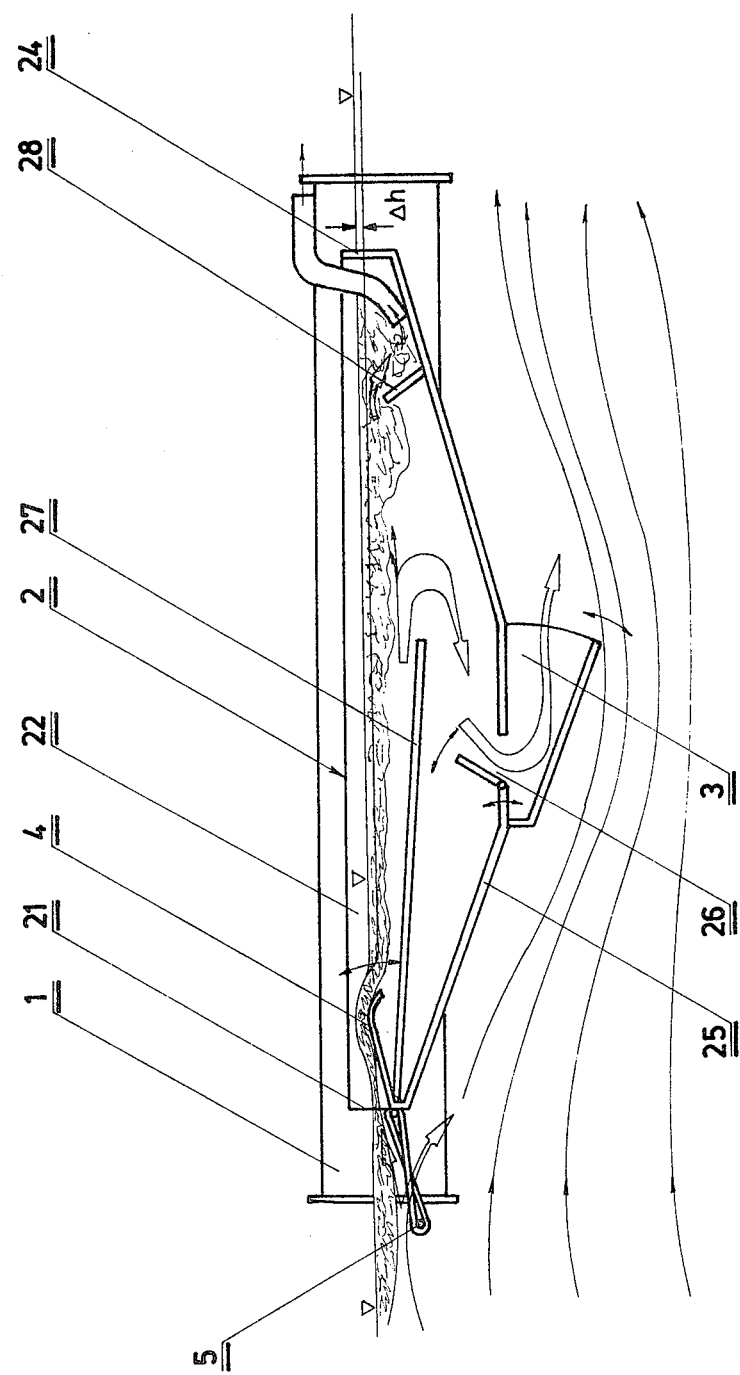

The device taken an example, illustrated on the drawings, contains practically a tank-line submersion body 2 with rectangular top view, provided with spillway 4 of adjustable height by turning along an axis on the open front end 21 facing the direction of water flow, encircling a rectangular water surface range by side walls 22, 23 and rear end 24. The downstream section of its bottom 25 is executed with a submersion depth first increasing from front end 21 provided with spillway 4 and then gradually decreasing. On bottom 25 of submersion body 2, approximately in the middle, in the greatest submersion depth, there is a hole 26 whose clear opening is adjustable by the angle position of a closing element. A further essential feature of submersion body 2 is that in its inner space there is a baffle plate 27 dividing the inner space of submersion body 2 in parts separated from each other, starting from front end 21 provided with spillway 4 overhanging the range above opening 26 being in bottom 25. There is also a deflection hopper 3 in bottom 25 of submersion body 2, covering opening 26 from outside, practically perpendicular to the direction of water flow, provided with an outlet orifice of adjustable cross section. In submersion body 2 in the rear end range, opposite to spillway 4 there is an impurity collecting zone separated a barrier 28 starting from bottom 25 and ending under the water surface and in case of impurity, e.g. oil removal by pumping, the end of a suction conduit joined to the suction stud is butting into it. Other mechanical, adhesion etc. impurity discharging means can be connected with said device according to the invention also in said zone. Submersion body 2 is kept floating by floats 1 placed on its two sides.

The device according to the invention operates as follows:

The flowing water, while bypassing from below float 2 kept floating and anchored by float 1, locally accelerates along contracted streamlines. In this way, one important feature of the method according to the invention can be achieved, namely in a flowing or forced flowing water cross section a cross-sectional range of increased flow rate is produced and maintained. As a result, according to the Bernoulli formula the increase of speed produces local suction effect through opening 26 formed on bottom 25 in the inner space of submersion body 2 and this results in permanent water level decrease in the water surface range provided with spillway 4, encircled by side walls 22, 23 and end wall 24. The rate of the suction effect can be set by means of the execution of the longitudinal section of submersion body 2, i.e. in case a given means is applied for various flow rates, by changing the throttle defining cross section of opening 26 and that of adjustable deflection hopper 3.

The impurities particularly oil floating on the surface flow together with the surface layer of water through spillway 4, by the help of the water level difference, without speed reduction, in the range of lowered water level of submersion body 2. By avoiding damming, as well as with help of grid 5 arranged in front of spillway 4 turbulent-free inflow of the impure surface water can be ensured, thus there will be no swirls causing losses in discharging. As structural material, rubber can preferably be used for making grid 5 due to its favorable damping and self-cleaning ability.

Referring to a further characteristic feature of the method according to the invention, separation of impurities and water can be performed by reducing the rate of surface water layer flow in the range of lowered water level and by changing the direction of flow. For this purpose baffle plate 27 placed in the inner space of submersion body 2 takes the liquid flow flowing in through spillway 4, leaving submersion body 2 through opening 26 onto a forced path of gradually increasing cross section bringing about accordingly the reduction of the flow rate, then making it perform a horizontal, approximately 180° turn too. It has been experienced that in the course of this, gravitational separation of impurities, particularly oil, and water flowing on the surface takes place. The impurities (oil) get collected in a practically flow-free zone provided with barrier 28 starting from bottom 25, ending under the lowered water surface, in a rear end part opposite to spillway 4 of submersion body 2, while the excess water leaves the inner space of submersion body 2 through opening 26 and deflection hopper 3 making repeated change of direction. Thereafter, the oil can be discharged in any of the ways already known.

It can be easily understood that it does not matter in the course of carrying out the method according to the invention and in the device suitable for said purpose, how the relative speed difference between the device and the water to be purified is produced. Therefore, the device for carrying out the method according to the invention can be made as equipment anchored properly in flowing surface water or as equipment to be moved in still water by vessels or otherwise. The scope of protection is not limited to the embodiment described above only by way of example with reference to the drawings, within the scope of protection defined by the attached claims. Other devices of differing embodiment can also be realized.

I claim:

1. A device for removing floating liquid impurities, particularly oil, from a flowing or forced-flowing water surface, comprising: a structural unit partly submerged in water, and having wall elements surrounding a range of water level lowered in relation to said surface, a tank-like submersion body with a bottom of a submersion depth first increasing downstream and then gradually decreasing downstream from a front end provided with an adjustable spillway of vertically variable position as compared to said submersion body, connected to said front end, said submersion body having on its open front end facing the direction of water flow, a swirl restricting diffusion grid, running essentially parallel with the direction of water flow, position in or under the dividing level between the surface water layer to be separated, and an opening at the deepest point on the submersion body, said opening being of adjustable cross-section and located above the zone of greatest flowing speed and of smallest pressure, and a deflection hopper surrounding said opening and being adjustable for locally increasing the outside flowing speed.

2. A device according to claim 1, wherein said diffusion grid is made of a resilient material.

3. A device as claimed in claim 1 or 2, comprising a baffle plate in the submersion body starting from said front end and overlapping the range above the opening and being located at an angle suitable for ensuring a turbulent-free deceleration of the surface water layer flowing through the spillway and containing the impurities.

* * * * *